(12) United States Patent
Wakumoto et al.

(10) Patent No.: US 11,310,131 B2
(45) Date of Patent: Apr. 19, 2022

(54) DATA NETWORK ANALYSIS SYSTEM AND METHOD FOR A COMMUNICATION NETWORK

(71) Applicant: Level 3 Communications, LLC, Broomfield, CO (US)

(72) Inventors: Steve R. Wakumoto, Golden, CO (US); Andrew S. Gerber, Denver, CO (US); John D. Clouatre, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1134 days.

(21) Appl. No.: 15/056,650

(22) Filed: Feb. 29, 2016

(65) Prior Publication Data
US 2017/0250911 A1    Aug. 31, 2017

(51) Int. Cl.
*H04L 43/045* (2022.01)
*H04L 43/10* (2022.01)
*H04L 43/08* (2022.01)
*H04L 9/40* (2022.01)
H04L 29/06 (2006.01)

(52) U.S. Cl.
CPC .......... *H04L 43/045* (2013.01); *H04L 43/08* (2013.01); *H04L 43/10* (2013.01); *H04L 63/1433* (2013.01)

(58) Field of Classification Search
CPC ....... H04L 43/00; H04L 43/045; H04L 43/08; H04L 43/10
See application file for complete search history.

(56) References Cited

U.S. PATENT DOCUMENTS

| | | | |
|---|---|---|---|
| 6,442,615 B1* | 8/2002 | Nordenstam | H04L 41/142 709/223 |
| 2004/0128554 A1* | 7/2004 | Maher, III | H04L 61/2553 726/11 |
| 2007/0174477 A1* | 7/2007 | Bostick | H04L 29/12122 709/245 |
| 2007/0230361 A1* | 10/2007 | Choudhury | H04L 29/06027 370/250 |
| 2007/0258382 A1 | 11/2007 | le Foll et al. | |
| 2008/0080495 A1 | 4/2008 | Barrett et al. | |
| 2008/0291839 A1 | 11/2008 | Hooper et al. | |
| 2009/0316602 A1* | 12/2009 | Nandy | H04L 45/02 370/254 |

(Continued)

OTHER PUBLICATIONS

International Search Report dated Oct. 31, 2016, Int'l Appl. No. PCT/US16/046845, Int'l Filing Date Aug. 12, 2016; 3 pgs.

(Continued)

*Primary Examiner* — Kevin C. Harper (57) ABSTRACT

A data network analysis system includes a computer-executable set of instructions that obtain service account information associated with a route provided to a customer through a data communication network having network elements. Using the service account information, the instructions identify a termination port that terminates the route to a customer premises equipment of the customer, and at least one target port of the route and those network elements that are assigned to convey the route through one or more of the network elements. The instructions then obtain the routing information for the route from each of the network elements that are assigned to convey the route.

16 Claims, 5 Drawing Sheets

(56) References Cited

U.S. PATENT DOCUMENTS

| | | | |
|---|---|---|---|
| 2010/0008233 A1 | 1/2010 | Ee et al. | |
| 2010/0188975 A1 | 7/2010 | Raleigh | |
| 2010/0299430 A1* | 11/2010 | Powers | H04L 63/1416 |
| | | | 709/224 |
| 2011/0016525 A1* | 1/2011 | Jeong | H04L 63/1425 |
| | | | 382/218 |
| 2011/0085449 A1 | 4/2011 | Jeyachandran | |
| 2012/0054338 A1 | 3/2012 | Ando | |
| 2012/0207161 A1 | 8/2012 | Uppalli et al. | |
| 2015/0052147 A1* | 2/2015 | Halabi | H04L 12/6418 |
| | | | 707/741 |
| 2017/0214718 A1* | 7/2017 | Couterier | H04L 63/0254 |
| 2018/0159884 A1* | 6/2018 | Meier | H04L 63/1425 |

OTHER PUBLICATIONS

Written Opinion of the International Searching Authority dated Oct. 31, 2016, Int'l Appl. No. PCT/US16/046845, Int'l Filing Date Aug. 12, 2016; 7pgs.

International Preliminary Report on Patentability, dated Sep. 4, 2018, Intl Appl. No. PCT/US16/046845, Intl Filing Date Aug. 12, 2016; 9 pgs.

\* cited by examiner

DATA NETWORK ANALYSIS SYSTEM AND METHOD FOR A COMMUNICATION NETWORK

TECHNICAL FIELD

Aspects of the present disclosure relate to communication networks and, in particular, to a data network analysis system and method for a communication network.

BACKGROUND

The explosive growth of data communication networks, particularly the Internet, presents tremendous opportunities and tremendous challenges for service providers. Data communication networks have enjoyed greater recent growth and success than their traditional circuit switched networks counterparts, such as the public switched telephone network (PSTN), due largely at least in part to their flexibility, scalability, and cost-effective allocation of resources. Nevertheless, this flexibility has created several challenges. One such challenge involves maintaining or otherwise servicing these data communications networks when failures invariably occur.

For example, modern data communication networks often use numerous communication protocols, such as a border gateway protocol (BGP), address resolution protocol (ARP), authentication, authorization, accounting (AAA), and the like, whose configurations often change to maintain proper operation for each network node implemented in the communication network. These protocols serve numerous purposes, such as providing self-healing connections so that connections may be automatically re-routed through the network, ensuring security and/or privacy of the network connections, authentication and authorization for qualified users, and the like. Thus, management of these communication networks often involve analysis of the underlying protocols that enable their use.

It is with these issues in mind, among others, that various aspects of the present disclosure were developed.

SUMMARY

According to one embodiment of the present disclosure, a data network analysis system includes a computer-executable set of instructions that obtain service account information associated with a route provided to a customer through a data communication network having network elements. Using the service account information, the instructions identify a termination port that terminates the route to a customer premises equipment of the customer, and at least one target port of the route and those network elements that are assigned to convey the route through one or more of the network elements. The instructions then obtain the routing information for the route from each of the network elements that are assigned to convey the route.

BRIEF DESCRIPTION OF THE DRAWINGS

The foregoing and other objects, features and advantages of the disclosure will be apparent from the following description of particular embodiments of the disclosure, as illustrated in the accompanying drawings in which like reference characters refer to the same components throughout the different views. The drawings are not necessarily to scale, emphasis instead being placed upon illustrating the principles of the disclosure.

DETAILED DESCRIPTION

Aspects of a data network analysis system and method described herein provides a tool for identifying any network elements (NEs) of a data communication network used to convey routes through the data communication network and display route information associated with those routes from each NE for view by a user. Whereas the configuration of routes established in a data communication network may change often due to various factors, such as due to changes in the paths of the routes, changes in the type and level of routes provided to certain customers, and changes in the NEs used to provide those routes, analysis of routes has heretofore remained a complex endeavor that has often necessitated the use of trained network savvy personnel. Embodiments of the present disclosure provide a solution to this inefficiency, among other advantages, by implementing a data network analysis system that obtains the routing information of certain specified NEs assigned to convey the routes and displays the obtained routing information in a manner that is simpler and easier to analyze that what has heretofore been provided by traditional data network analysis tools.

Data communication networks are typically provided by network providers that purchase, lease, or otherwise obtain NEs that may be configured over a geographical region for providing one or more communication routes for their customers. Customer services that may be provided include, for example, voice communication services, data communication services (e.g., Internet, e-mail messaging, etc.), and video communication services (e.g., multimedia messaging services (MMS), digital video broadcast services (DVB), etc.). In most cases, these routes are provided in a manner that are seamless (e.g., transparent) to the customer. Nevertheless, in some cases, problems arise with these routes, which problems may require involvement by the network providers to correct. For such cases, network providers have implemented technical assistance centers, which may also referred to as call centers, where trained personnel field calls from their customers to identify the nature of any problem exhibited by the use of their routes and determine one or more root causes of the problem to provide a successful resolution to any problems with those routes.

Technical assistance centers typically involve call center personnel who initially field phone calls from customers, and technical personnel, often with deeper technical expertise or experience, that analyze and fix problems identified by the call center personnel. It would be beneficial to provide certain network analysis tools that may be used by such personnel, particularly persons with less technical training, to assist in diagnosing network problems before delegating the resolution of those problems to personnel with deeper technical expertise.

Figure 1A:
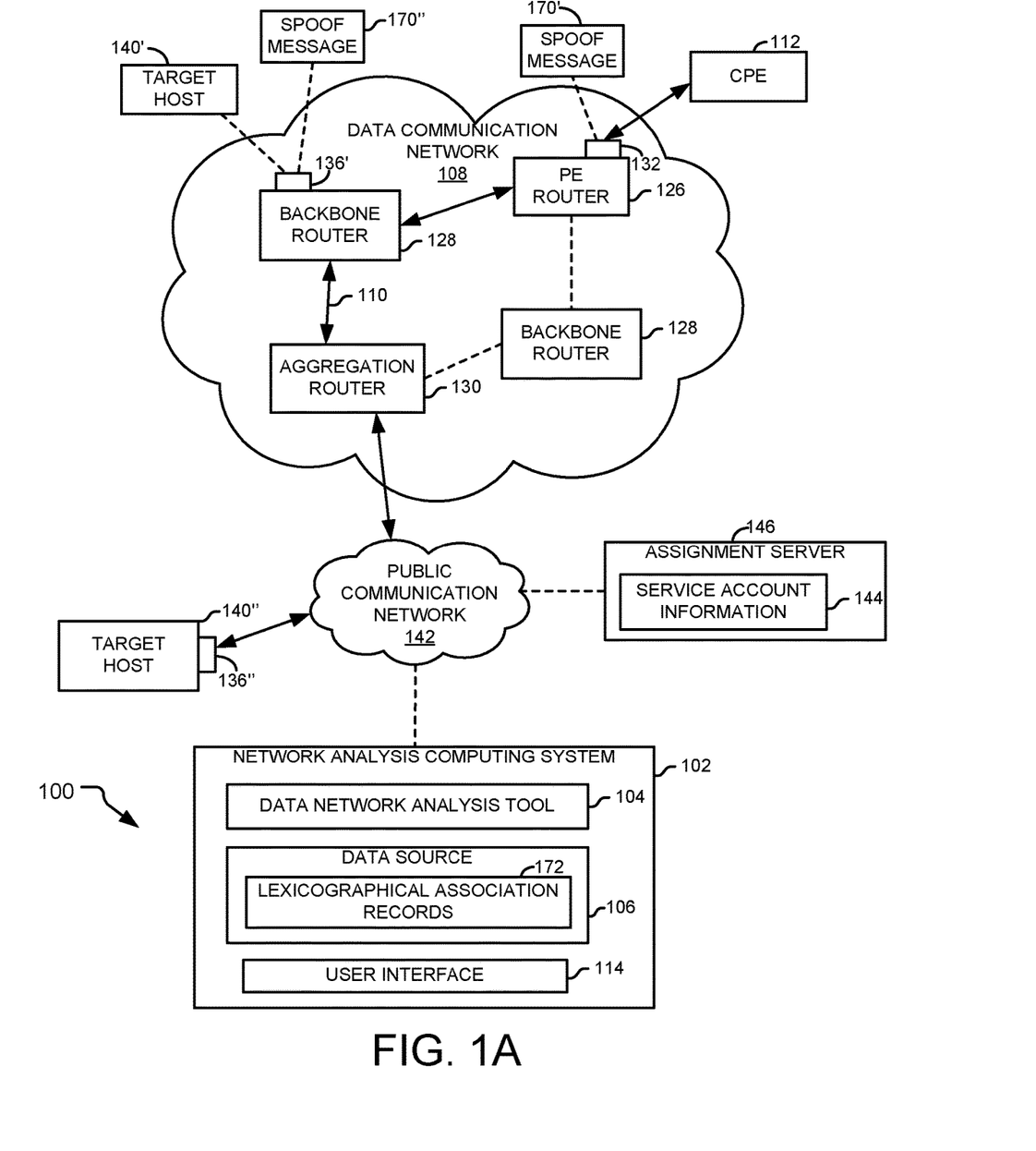
FIG. 1A is a block diagram of an example data network analysis system according to one embodiment of the present disclosure.
Figure 1B:
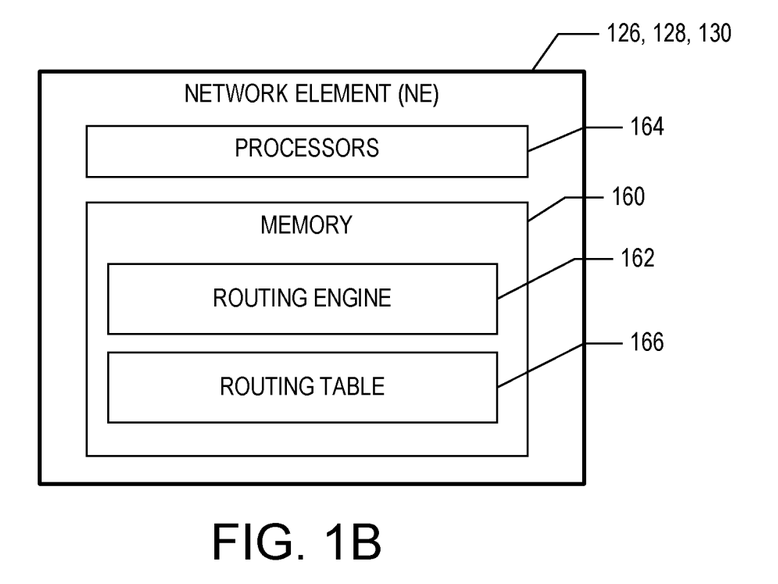
FIG. 1B depicts an example network element (NE) according to one embodiment of the present disclosure.

FIGS. 1A and 1B depict an example data network analysis system 100 that may be used to analyze the services provided to customers of a data communication network 108 according to one embodiment of the present disclosure. The data network analysis system 100 includes a network analysis computing system 102 that stores a network analysis tool 104 and a data source 106. As will be described in detail herein below, the tool 104 communicates with the data communication network 108 to obtain route information associated with routes 110 provided to a customer premises equipment (CPE) 112 and display the route information for view on a user interface 114 for view by a user.

The data communication network 108 includes any type of data network having multiple NEs for conveying paths through the data communication network 108. The data communication network 108 includes multiple NEs, such as a provider edge (PE) router 126, one or more backbone routers 128, and an aggregation router 130 that provide interconnectivity for routes through the network using routing schemes provided by the network layer (e.g., layer 3) of the OSI model protocol.

In general, the PE router 126 provides a termination port 132 (e.g., termination point) to a CPE 112 owned and administrated by a customer of the data communication network 108. Each termination port 132 generally denotes a termination point at which the route is handed off to the CPE 112. That is, the termination point denotes a certain point in the data communication network 108 at which responsibility for the proper operation of the route by the service provider ends and which responsibility for the customer begins. The backbone routers 128 serve as nodes for relaying routes through the network 108, while the aggregation router 130 serves as a gateway for inter-domain communication. Although the particular communication network 108 as shown and described herein are simplified examples, it should be understood that an actual network deploying the concepts described herein may employ numerous NEs (NEs) and customer devices using additional, fewer, or different NEs not specifically shown and described herein.

The CPE 112 may be any type that is configured to communicate with the data communication network 108 using appropriate protocols established for the network. The CPE 112 communicates with the data communication network 108 by transmitting and receiving data packets that are routed through the data communication network 108 along respective communication routes 110. The CPE 112 has one or more processors and executable instructions stored in volatile and/or non-volatile memory for performing the actions and/or steps described herein.

The data communication network 108 provides routes 110 for customers using NEs that convey or otherwise relay data traffic from termination ports 132 configured on PE routers 126 to target ports 136 of one or more remotely configured target hosts 140. The target host for each route may include any suitable device having connectivity to the data communication network 108, such as the same NE or another NE within the same network domain, such as one that may be established between the CPE 112 and a target port 136' of the backbone router 128 that provides connectivity to a target host 140'. Another example target host may include a target port 136" of public target host 140" having connectivity to the data communication network 108 via a public communication network 142, such as the Internet.

In general, each route 110 is based upon a contractual agreement established between the customer and customer service provider indicating what level of communication services are to be provided. In general, a contractual agreement between the service provider that manages the network analysis computing system 102 and a customer of the communication network specifies what services are to be provided and any performance levels associated with these services. For example, the service provider may offer multiple service plans that each provides differing combinations and levels of communication services, such as voice communication services, video communication services, and/or data communication services, such as short messaging services (SMS), multimedia messaging services (MMS), and the like. Additionally, the service plans offered by the service provider may specify varying performance levels associated with each communication service, such as quality of service (QoS) levels, grade of service (GoS) levels, and/or terms of service (ToS) levels.

Information about each termination port 132 allocated to each customer is stored as service account information 144 in an assignment server 146. The assignment server 146 may be any type of device that stores information about the type of route to be allocated to each customer and the termination port 132 relative to an NE. For example, the assignment server 146 may include a server that functions according to an authentication, authorization, and accounting (AAA) protocol for storing and administering route information to be used for implementing the routes for each customer at a particular termination port 132.

The route 110 may be a dedicated, non-transient communication route (e.g., statically assigned routes) between two or more ports, or a session dependent communication route (e.g., a dynamically assigned route) that is established prior to each communication session and torn down after the communication session is completed. Additionally, the route 110 may include a single termination port 132 or multiple termination points, such as may be used in the context of an organization employing multiple personnel each having their own network connection. An example route 110 that may include a single termination point may be one that conveys traffic from a termination port 132, which has been assigned to a particular user, to any other destination in the data communication network 108, such as one of the target hosts 140 shown in FIG. 1A. An example route 110 that includes multiple termination points (e.g., a multi-point route) may be a point-to-point route in which data traffic is constrained to travel between two distinct ports on the data communication network 108.

As best shown in FIG. 1B, a network NE 126, 128, 130, which is often referred to as a router, includes a memory 160 for storing a routing engine 162 that is executed by one or more processors 164 to interconnect routes using routing information included in a routing table 166 that is associated with a network layer (e.g., layer 3), such as Internet protocol (IP) addresses associated with other NEs in its respective network domain and port information for specific routes to be provided through the network 108. For example, the routing information for specific routes through the network 108 may include information generated via an address resolution protocol (ARP) process.

The use of routing tables 166 of network NEs 126, 128, and 130 provides for a relatively flexible and scalable administration for their respective network domains. For example, the addition of a new route to the network 108 can be provided, in many cases, by merely updating or otherwise adding routing information to the routing tables 166 of certain NEs to establish the route without requiring any physical modification to the NEs. Additionally, routes can be made to be self-healing in that, if a particular link conveying a route fails due to some fault (e.g., plow cut, intermittent connection, faulty wiring, equipment malfunction, etc.), the routing engine may automatically re-connect the route through other NEs such that the overall integrity of each route is maintained. Nevertheless, this relatively flexible management of routes has yielded routing tables 166 that can be relatively complex and thus difficult to analyze, particularly when the analysis is to be performed by personnel that have not been extensively trained to detect problems with these routes or the protocols used for establishing and maintaining the routes 110 for their respective customers.

Embodiments of the present disclosure provide a solution to these problems, among other problems, by obtaining these routing tables 166 of network NEs 126, 128, and 130, and normalizing the obtained routing information so that the routing information may be presented to a user in a manner that is easy to comprehend, and may in some cases, provide for troubleshooting of the route by generally untrained personnel, such as call center personnel who may not be specifically trained to diagnose network failures.

In general, the data network analysis tool 104 obtains service account information, such as that which may be provided to a call center person during a service call received from a customer at a call center, to identify a termination port associated with that service account information. The tool 104 may also obtain target port information of a target NE comprising the remote termination point of the route 110. Given the obtained termination port 132 and target port 136 of the route 110, the tool 104 may discover those NEs that are involved in providing the route 110, obtain route information from each of those NEs, and normalize the obtained route information to ease analysis by the user, which may be a call center person that does not have significant training in the analysis of data networks.

Figure 2:
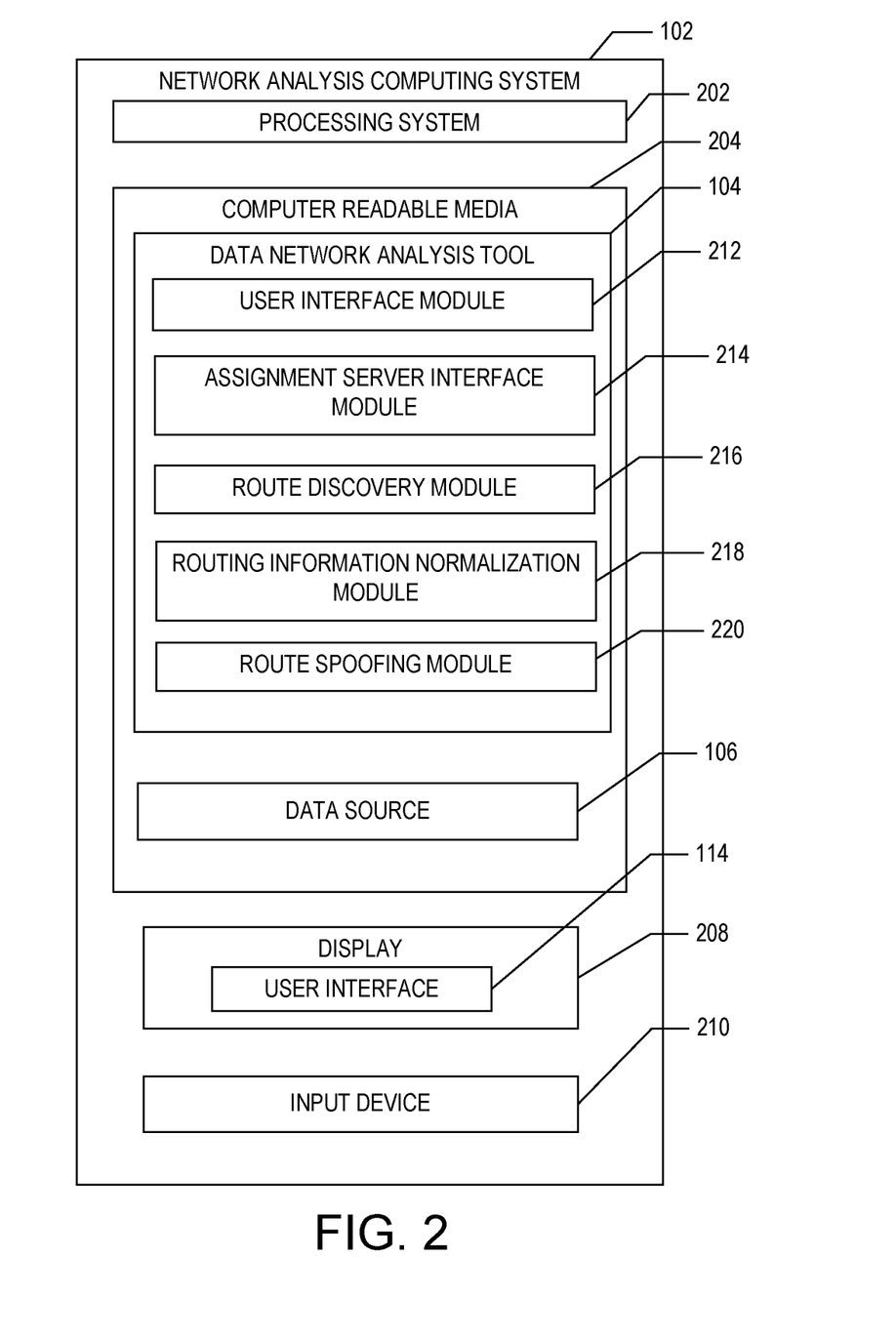
FIG. 2 depicts a diagram of an example data analysis computing system according to one embodiment of the present disclosure.

FIG. 2 is a block diagram depicting an example data network analysis tool 104 executed on the network analysis computing system 102 according to one embodiment of the present disclosure. The network analysis computing system 102 includes a processing system 202 that includes one or more processors or other processing devices. A processor is hardware. Examples of such a computing system include one or more servers, personal computers, mobile computers and/or other mobile devices, and other computing devices. The network analysis computing system 102 may communicate with the NEs via wireless, wired, and/or optical communications.

According to one aspect, the network analysis computing system 102 includes a tangible and non-transient computer readable media 204 on which the tool 104, in the form of computer executable instructions, and data source 106 are stored. The tool 104 includes instructions or modules that are executable by the processing system 202 to perform the features of the data network analysis system 100 described herein.

The computer readable media 204 is tangible and may include volatile media, nonvolatile media, removable media, non-removable media, and/or another available media that can be accessed by the Network analysis computing system 102.

According to one aspect, the computing system 102 may include a user interface 114 displayed on a display 208, such as a computer monitor, for displaying data. The computing system 102 may also include an input device 210, such as a keyboard or a pointing device (e.g., a mouse, trackball, pen, or touch screen) to enter data into or interact with the user interface 114. According to one aspect, the tool 104 includes instructions or modules that are executable by the processing system 202 as will be described in detail herein below.

A user interface module 212 facilitates the receipt of input data and/or output data from or to a user, respectively, for manipulating the operation of the system 100. In one example, the user interface module 212 may receive user input for manipulating or otherwise modifying how each rule is applied to detect malicious route redirect attempts. For example, the user interface module 212 may interact with a user, such as a call center person, to receive customer information, such as personal identifying information, or problem symptoms that have verbally conveyed from the customer. As another example, the user interface module 212 may display the routing information from each of the NEs configured to convey a route 110 to be analyzed.

An assignment server interface module 214 communicates with an assignment server 146 to obtain service account information 144 associated with a particular route provided to a customer. For example, the assignment server 146 may include an AAA server that stores information associated with any agreed upon services to be provided by the routes 110 established for the customer. In one embodiment, the assignment server interface module 214 determines the port assignments for the customer using the obtained service information in which the port assignments indicate a specified termination point at which the customer may access the data communication network 108 using their own CPE 112. In another embodiment, the assignment server interface module 214 obtains the port assignments directly from the assignment server 146.

A route discovery module 216 discovers which NEs are allocated to handle the routes 110. For example, the route discovery module 216 may perform a sequential process of analyzing the routing table 166 of network NEs 126, 128, 130 to identify those NEs assigned to convey the route 110 to be analyzed. In certain cases where the route is a multi-point route including two or more termination points, such as a point-to-point connection, the route discovery module 216 may discover the NEs from each port assigned to the route 110.

A route information normalization module 218 normalizes route information obtained from each of the NEs to have a standardized common format for view by the user. In many cases, many currently implemented data communication networks are often deployed with NEs that may differ according to vendor (e.g., manufacturer) as well as a model provided by each vendor. As such, these differing NEs may generate routing information that differs from one another. For example, the NE of one vendor may identify an IP address as 'IP addr: xxx.xxx.xxx.xxx', while the NE from another vendor may identify an IP address as 'network address: xxx.xxx.xxx.xxx'. In such a case, the route information normalization module 218 may translate the information from both NEs to 'IP address: xxx.xxx.xxx.xxx' such that, when displayed on the user interface 114 for view by the user, the information displayed for consumption by the user is in a standardized format for ease of analysis. Thus, remedial analysis of any potential problems with the route may at least partially be conducted by untrained personnel in certain embodiments.

A route spoofing module 220 injects spoof messages 170 into the routes 110 established in the data communication network 108 according to user requests in order to provide another technique for testing the routes 110. The route spoofing module 220 may inject spoof messages 170 at any NE along a route 110 to be analyzed. As shown in FIG. 1A, a spoof message 170 may be injected at a backbone router 128 that conveys the route 110 to be analyzed. Nevertheless, the spoof message 170 may be injected at any desired NE along a route to be analyzed.

Generally speaking, the injection of spoof messages 170 at certain points along a route 110 may provide an additional mechanism for testing a route 110. The spoof message may be any type, such as a ping message transmits the spoof message 170 to a specified destination with instructions to respond with an acknowledgment message, or a traceroute message in which various performance parameters obtained from each NE along the route may be obtained.

Embodiments of the route spoofing module 220 may provide for an enhanced level of testing that may not necessarily be provided by the route discovery module 216. For example, the injection of spoof messages 170 may identify connectivity problems that may not be easily identified by analysis of routing information alone, such as one that may be created by a routing algorithm implemented on a particular NE that blocks messages of a certain type while allowing other types of messages. Additionally, the spoof messages 170 may be introduced at differing points along the route to identify any blocked points along the route. For example, the route spoofing module 220 may inject a spoof message at the termination point assigned to the customer to test when the termination point has no connectivity to a target host. If the spoof message is unsuccessful, another spoof message may be injected at the aggregation NE associated with that termination point to isolate the connectivity problem to either the network domain to which the termination point belongs or to some other NE outside the network domain.

It should be appreciated that the modules described herein are provided only as an example of a computing device that may execute the data network analysis tool 104 according to the teachings of the present disclosure, and that other computing devices may have the same modules, different modules, additional modules, or fewer modules than those described herein. For example, one or more modules as described in FIG. 2 may be combined into a single module. As another example, certain modules described herein may be encoded and executed on other computing devices, such as the NE used by the user.

Figure 3:
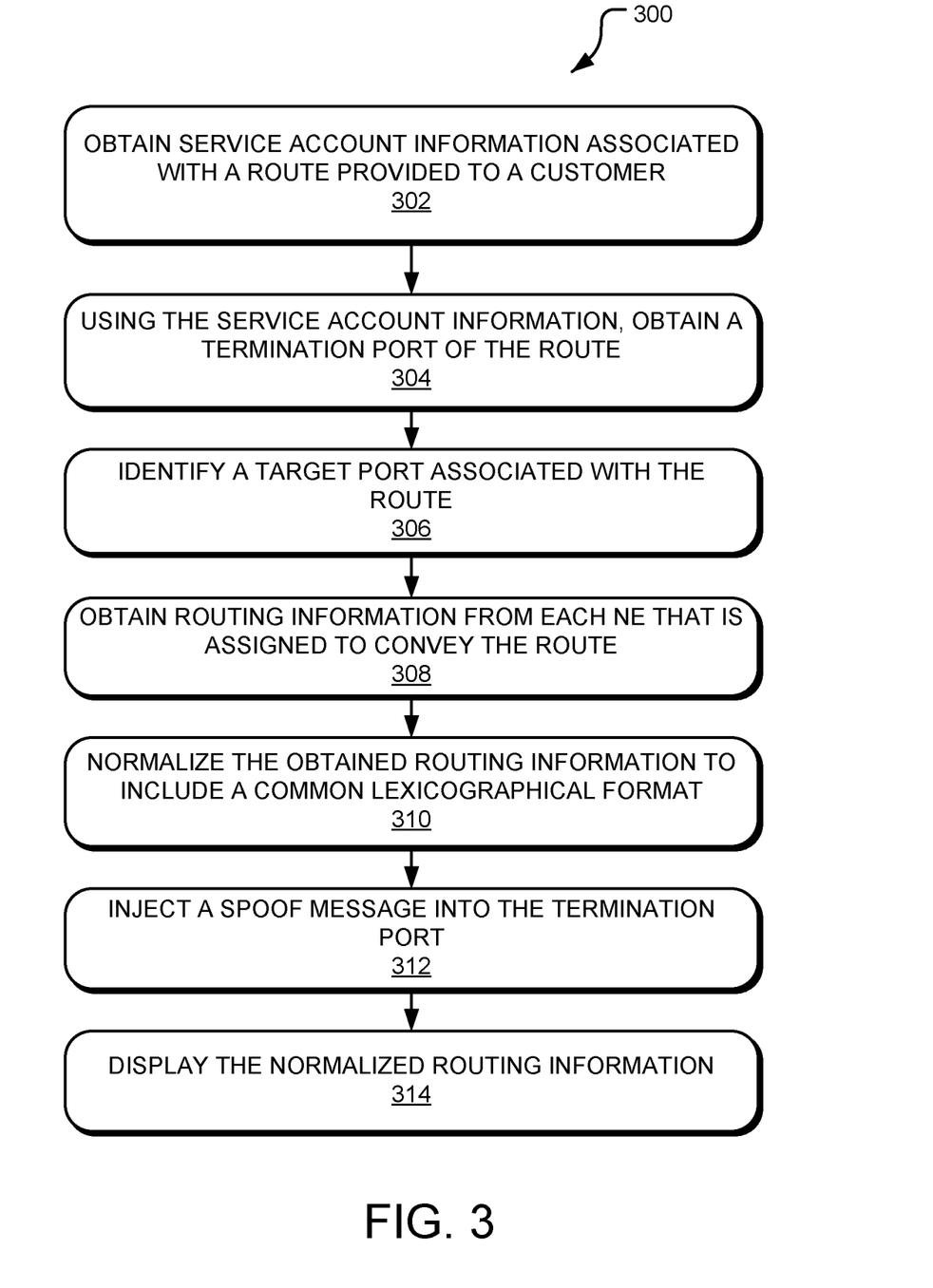
FIG. 3 is a flowchart depicting an example process that may be performed by the data network analysis system according to one embodiment of the present disclosure.

FIG. 3 illustrates an example process that may be performed by the data network analysis tool 104 according to the teachings of the present disclosure.

In step 302, the tool 104 obtains service account information associated with a route provided to a customer. For example, the data network analysis tool 104 may be used by a call center person who fields incoming phone calls from customers experiencing problems with their service, which may include one or more assigned routes throughout the data communication network 108. Upon fielding the call, the call center person may obtain the unique identity of the customer and enter that identity into the user interface 114 of the tool 104, so that the tool 104 may access their account information to determine which particular service has been assigned to that customer. In one embodiment, the tool 104 accesses the service account information from an assignment server 146 configured in the data communication network 108. In another embodiment, the assignment server 146 is an AAA server.

In step 304, the tool 104 identifies a termination port 132 that terminates the route to the customer. For example, the tool 104 may identify the termination port 132 using information provided by the assignment server 146.

In step 306, the tool 104 identifies a target port 136 that is associated with the route 110. The route may be a dedicated communication route between two or more ports, or a session dependent communication route that is established (setup) prior to each communication session and the route repurposed (torn down) after the communication session is completed. If the route 110 is a dedicated communication route, the tool 104 may identify the target port 136 using information obtained from the assignment server 146. Conversely, if the route 110 is a session dependent communication route, the tool 104 may identify the target port 136 using a discovery process as described below with reference to step 308, or from verbal communication with the customer via the phone conversation. For example, the call center person may obtain the target port information verbally from the customer who may be experiencing difficulty in reaching a particular target port (e.g., a website, a remotely configured phone, a data server, etc.). Upon receipt of the verbal communication, the call center person may enter the target port information through the user interface 114 of the tool 104.

In step 308, the tool 104, using the obtained termination port, identifies those NEs in the data communication network 108 that are assigned to convey the route 110. In one embodiment, the tool 104 identifies the NEs used to convey the route 110 via a discovery process in which each NE beginning with the one having the assigned termination port 132 is queried to obtain routing information for that termination port 132, and thereafter querying successive NEs along the route 110, until the target port 136 is reached. In some cases, the target port 136 may not be reached, thus indicating to the user, that the last NE identified along the route 110 may possess incorrect routing information for that route 110.

In step 310, the tool 104 normalizes the routing information obtained from each of the NEs along the route 110 to generate a common reference to the information (e.g., common terminology). Whereas the multiple NEs of a data communication network 108 may be different in their function as well as when and who they are manufactured by, the routing information reported from each may include a substantially different lexicographical form from one another. Therefore, the tool 104 may translate the obtained routing information from one or more of the NEs to a common lexicographical format. For example, the tool 104 may translate certain routing information by accessing the lexicographical association records 172 stored in the data source, which associates a certain lexicographical format included in the routing information and replaces the received lexicographical format with another format that is standardized for easy view and analysis by the user.

In step 312, the tool 104 may optionally inject a spoof message into the termination port 132. The spoof message 170 may be injected for various purposes. For example, the spoof message 170 may include a ping message that has a destined for the target port 136 that tests end-to-end connectivity for the route 110. That is, a successful response to the ping message from the target port 136 may provide a relatively high likelihood that the route 110 does have connectivity from the termination port 132 to the target port 136. Nevertheless, the spoof message 170 may include other forms of messages, such as a traceroute message that analyzes the routing information from each NE along the route 110 from the termination port 132 to the target port 136.

In step 314, the tool 104 displays the normalized routing information for view by the user. The normalized routing information may be displayed in any suitable form. For example, the tool 104 may display the normalized routing information as a list of NEs that progresses from the termination port 132 assigned to the customer to the NE associated with the target port 136. Additionally, the tool 104 may display the normalized routing information in graphical form that displays the NEs as nodes and lines representing links between each of the nodes that form the route 110 assigned to the customer.

When the normalized routing information is displayed, the tool 104 continues processing at step 302 for processing the routing information for other routes 110 in the data communication network 108. Nevertheless, when use of the tool 104 is no longer needed or desired, the process ends.

It should be appreciated that the process described herein is provided only as an example and that the data network analysis system 100 may execute additional steps, fewer steps, or differing steps than those described herein. For example, the steps 302 through 312 may be executed in any suitable order; that is, the steps as described in FIG. 3 are not limited to execution in any particular sequence. As another example, either of the steps 302 through 312 described herein may be executed by another separately configured computing system without departing from the spirit or scope of the present disclosure.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 4:
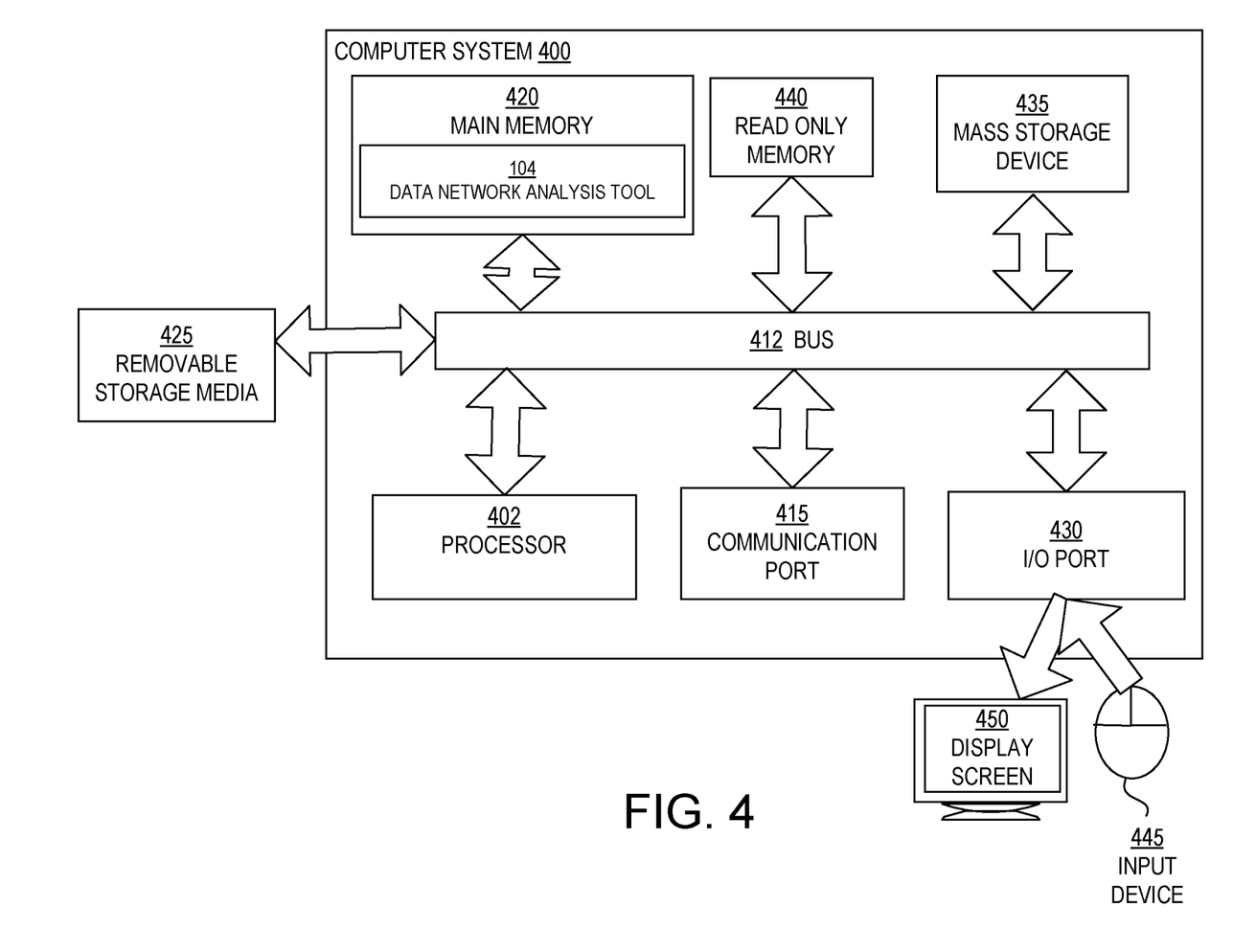
FIG. 4 illustrates an example computer system according to one embodiment of the present disclosure.

For example, FIG. 4 is a block diagram illustrating an example of a host or computer system 400 which may be used in implementing the embodiments of the present disclosure. The computer system (system) includes one or more processors 402. Processors 402 may include one or more internal levels of cache (not shown) and a bus controller or bus interface unit to direct interaction with the processor bus 412. Processor bus 412, also known as the host bus or the front side bus, may be used to couple the processors 402 to other components of the system 400. For example, the computer system 400 may include a memory controller for interfacing a main memory 420 with the processor bus 412. The main memory 420 typically includes one or more memory cards and a control circuit (not shown). The system interface 400 may also include a communication port 415 to interface one or more I/O bridges or I/O devices with the processor bus 412.

I/O port 430 may also include an input device 445, such as an alphanumeric input device, including alphanumeric and other keys for communicating information and/or command selections to the processors 402. Another type of user input device includes cursor control, such as a mouse, a trackball, or cursor direction keys for communicating direction information and command selections to the processors 402 and for controlling cursor movement on the display device 450.

System 400 may include a dynamic storage device, such as main memory 420, removable storage media 425, mass storage device 435, or other computer-readable devices coupled to the processor bus 412 for storing information and instructions to be executed by the processors 402. Main memory 420 also may be used for storing the data network analysis tool 104 and/or other temporary variables or other intermediate information during execution of instructions by the processors 402. System 400 may include a read only memory (ROM) 440 and/or other static storage device coupled to the processor bus 412 for storing static information and instructions for the processors 402. The system set forth in FIG. 4 is but one possible example of a computer system that may employ or be configured in accordance with aspects of the present disclosure.

According to one embodiment, the above techniques may be performed by computer system 400 in response to processor 402 executing one or more sequences of one or more instructions contained in main memory 420. These instructions may be read into main memory 420 from another machine-readable medium, such as a storage device. Execution of the sequences of instructions contained in main memory 420 may cause processors 402 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 420. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A data network analysis system comprising:
a computing system including at least one processor and at least one tangible memory for storing instructions that are executed by the at least one processor to:
obtain service account information associated with a route provided to a customer through a data communication network comprising a plurality of network elements;
using the service account information, identify a termination port that terminates the route to a customer premises equipment of the customer;
identify at least one target port of the route;
identify a subset of the network elements that are assigned to convey the route through one or more of the network elements;
obtain the routing information for the route from each of the network elements that are assigned to convey the route, wherein the routing information includes at least an Internet Protocol (IP) address;
normalize the obtained routing information from each of the network elements, wherein normalizing the obtained routing information includes normalizing the IP address; and
generate a spoof message that originates at the termination port and is destined for the target port, the spoof message comprising a ping message.

2. The data network analysis system of claim 1, wherein the instructions are further executed to obtain the termination port by accessing an assignment server that stores the service account information associated with a contract established between the customer and a service provider that provides the route to the customer.

3. The data network analysis system of claim 1, wherein the network elements establish the route using a network layer of the Open Systems Interconnection (OSI) model protocol.

4. The data network analysis system of claim 3, wherein the instructions are further executed to determine whether port information associated with the termination port is included in the address resolution protocol (ARP) tables in each of the subset of network elements.

5. The data network analysis system of claim 1, wherein the instructions are further executed to generate a spoof message that originates at one of the network elements that is separate and distinct from the network element that provides the termination port, the spoof message destined for the target port.

6. The data network analysis system of claim 1, wherein the instructions are further executed to:
facilitate display of the normalized routing information on the display for view by the user.

7. A data network analysis method comprising:
obtaining, using instructions stored on at least one computer-readable medium and executed by at least one processor, service account information associated with a route provided to a customer through a data communication network comprising a plurality of network elements;
identifying, using the instructions, a termination port that terminates the route to a customer premises equipment of the customer using the service account information;
identifying, using the instructions, at least one target port of the route;
identifying, using the instructions, a subset of the network elements that are assigned to convey the route through one or more of the network elements;
obtaining, using the instructions, the routing information for the route from each of the network elements that are assigned to convey the route, wherein the routing information includes at least an Internet Protocol (IP) address;
normalizing the obtained routing information from each of the network elements, wherein normalizing the obtained routing information includes normalizing the IP address;
facilitate, using the instructions, display of the normalized routing information on a display for view by a user; and
generating, using the instructions, a spoof message that originates at the termination port and is destined for the target port, the spoof message comprising a ping message.

8. The data network analysis method of claim 7, further comprising obtaining the termination port by accessing an assignment server that stores the service account information associated with a contract established between the customer and a service provider that provides the route to the customer.

9. The data network analysis method of claim 7, wherein the network elements establish the route using a network layer of the Open Systems Interconnection (OSI) model protocol.

10. The data network analysis method of claim 9, further comprising determining whether port information associated with the termination port is included in the address resolution protocol (ARP) tables in each of the subset of network elements.

11. The data network analysis method of claim 7, further comprising generating a spoof message that originates at one of the network elements that is separate and distinct from the network element that provides the termination port, the spoof message destined for the target port.

12. An article of manufacture, comprising a computer-readable medium having instructions stored thereon, the instructions, when executed by a processor, cause the computer to perform the operations comprising:
obtain service account information associated with a route provided to a customer through a data communication network comprising a plurality of network elements;
using the service account information, identify a termination port that terminates the route to a customer premises equipment of the customer;
identify at least one target port of the route;

identify a subset of the network elements that are assigned to convey the route through one or more of the network elements;

obtain the routing information for the route from each of the network elements that are assigned to convey the route, wherein the routing information includes at least an Internet Protocol (IP) address;

normalize the obtained routing information from each of the network elements, wherein normalizing the obtained routing information includes normalizing the IP address; and generate a spoof message that originates at the termination port and is destined for the target port, the spoof message comprising a ping message.

13. The article of manufacture of claim 12, wherein the network elements establish the route using a network layer of the Open Systems Interconnection (OSI) model protocol.

14. The article of manufacture of claim 12, including instructions that are executed to:

obtain the termination port by accessing an assignment server that stores the service account information associated with a contract established between the customer and a service provider that provides the route to the customer; and facilitate display of the obtained routing information on a display for view by a user.

15. The article of manufacture of claim 14, wherein the instructions are further executed to determine whether port information associated with the termination port is included in the address resolution protocol (ARP) tables in each of the subset of network elements.

16. The article of manufacture of claim 12, wherein the instructions are further executed to generate a spoof message that originates at one of the network elements that is separate and distinct from the network element that provides the termination port, the spoof message destined for the target port.

* * * * *